C. E. BEACH & H. W. DOUGHTY.
TESTING SYSTEM AND MECHANISM FOR ELECTRICAL CIRCUITS.
APPLICATION FILED APR. 9, 1912.
1,089,814.  Patented Mar. 10, 1914.
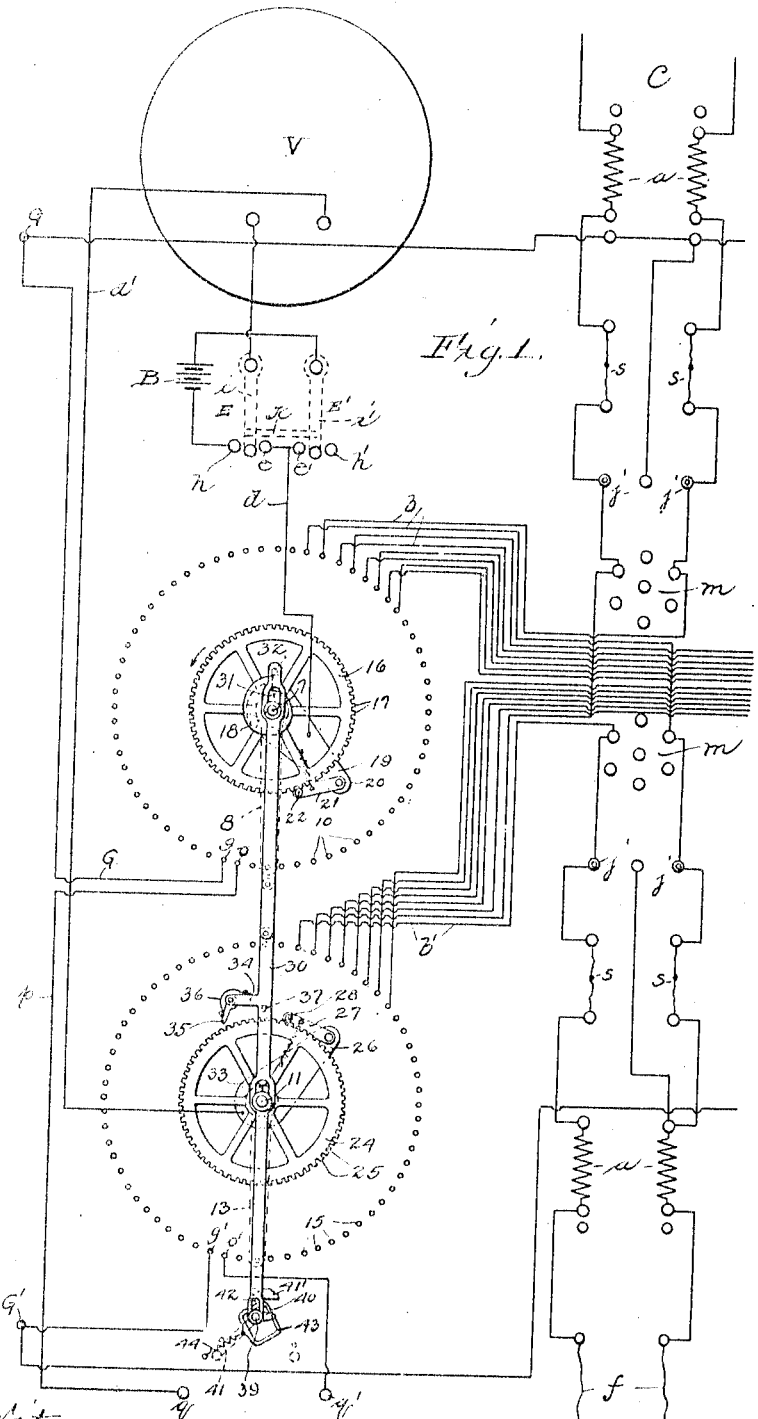

UNITED STATES PATENT OFFICE.

CLARENCE E. BEACH AND HERMAN W. DOUGHTY, OF BINGHAMTON, NEW YORK, ASSIGNORS TO GEORGE O. KNAPP, OF NEW YORK, N. Y.

TESTING SYSTEM AND MECHANISM FOR ELECTRICAL CIRCUITS.

1,089,814. Specification of Letters Patent. Patented Mar. 10, 1914.

Application filed April 9, 1912. Serial No. 689,588.

*To all whom it may concern:*

Be it known that we, CLARENCE E. BEACH and HERMAN W. DOUGHTY, both of Binghamton, county of Broome, State of New York, have invented new and useful Improvements in Testing Systems and Mechanism for Electrical Circuits, of which the following is a specification.

Our invention relates to improved testing system and testing mechanism for electrical circuits, and the general object thereof is to provide improved circuit controller mechanisms and circuit arrangement therefor for enabling the conductors of electrical circuits to be more rapidly and efficiently tested out for grounds, crosses between circuits, etc.

Our invention is applicable to any electrical system, and particularly adaptable in systems such as fire alarm systems where periodic tests are made from a central station for grounds, crosses between circuits, etc., and the various controlling mechanisms forming parts of our invention are preferably applied to the central station switchboard which carries various circuit switch mechanisms and protecting mechanisms and from which the various external circuits extend.

More in detail our invention contemplates provision for two main switch mechanisms, each comprising a movable contact arm and a plurality of contact terminals adapted to be engaged by said arm, and being connected through conductors with one side of the circuits to be tested, each of these switch mechanisms having also a ground contact. Testing switch mechanism is also provided for placing a test battery in series with a testing instrument and for connecting the terminals of this test circuit with the contact arms of the switch mechanisms above referred to, so that test can be made for crosses between any of the circuits or for grounds on any of the circuits.

The further object of the invention is to provide means whereby one switch arm can be held in contact with any selected contact while the arm of the other switch mechanism is carried into engagement with its various associated contacts, so that the contact selected on the one switch mechanism may be tested with the various contacts engaged by the arm of the other switch mechanism.

The further object is to provide improved inter-connecting mechanism between the switch mechanisms to automatically cause step-by-step engagement of one switch arm with its contacts while the contact arm of the other switch mechanism is moved manually in the successive engagement with its associated contacts. Provision is also made so that the inter-connecting mechanism can be readily set for some synchronous movement of the switch mechanisms, and be disconnected to allow the switch mechanisms to be moved independently of each other. Provision is also made to enable testing for grounds or crosses independently of the supply batteries for the various external circuits, whether such batteries be connected or disconnected.

Our invention also involves other important features, and by referring to the accompanying drawings our invention and its various features will be clearly understood.

In the accompanying drawings, we have shown the invention and its various features applied to a central station switchboard for fire alarm systems, and in the drawings, Figure 1 is a rear elevation of the board, to which our invention is applied showing the testing mechanism arrangement; and Fig. 2 is a side elevational view of the switch mechanisms.

Secured in the switchboard 5, is a bushing 6 which journals the shaft 7, carrying at the front side of the board a switcharm 8, having a contact spring 9 for engaging successively with the heads of contact posts 10 extending through and secured to the switchboard and arranged in a circle concentric with the shaft 7. Below the shaft 7 is a shaft 11 journaled in the bushing 12 secured in the switchboard and which carries at its front end the switch lever 13 having contact spring 14 for engaging the heads of contact posts 15 secured to the switchboard and arranged in a circle concentric with the shaft 11. The rear end of shaft 7 has secured thereto a wheel 16 having peripheral teeth 17, and a snail cam 18 is also secured to the shaft 7 at the rear of wheel 16, the wheel and cam rotating as the switch lever 8 is carried about the contacts 10. A plate 19, secured against the rear face of the switchboard, has a post 20 to the end of which is pivoted a brake or detent arm 21 journaling at its end a roller 22, a spring 23 extending between the arm 21 and a post on the plate 19 tending to hold the roller against the periphery of wheel 16 and between the teeth thereof so as to brake this wheel and to hold it against accidental displacement but to allow ready rotation thereof by means of switch lever 8.

The rear end of shaft 11 has secured thereto a wheel 24 similar to wheel 16 and having peripheral teeth 25. A plate 26, secured to the rear face of the board, pivots the brake lever 27 at the end of which is a roller 28 which is held against the periphery of the wheel by the action of spring 29. With the mechanism thus far described, the switch arms 8 and 13 can be independently rotated to connect with any of the respective contact posts, and the spring actuated brake levers will yieldingly lock the wheels 16 and 24, and thereby the switch arms, in any position to which they have been moved.

Means are provided for mechanically inter-connecting the switch arms so that upon actuation of one of the arms, the other will be automatically caused to travel over its associated contacts. The connecting bar structure 30 has, at its upper end, the vertical slot 31 for receiving the rear end of the upper shaft 7, and also carries a block 32 for coöperating with the snail cam 18 so that the connecting bar structure is first gradually raised and then suddenly released when the arm 8 is rotated. The connecting bar has also a slot 33 for receiving the rear end of the lower shaft 11, this slot being provided so that the bar can clear the shaft and be guided in its vertical movement by the shaft. Above the wheel 24 the bar has a lateral extension 34 whose end pivots a pawl 35, the spring 36 extending from the extension 34 tending to hold the pawl in substantially vertical position as indicated. In the position shown, the block 32 at the upper end of the bar structure 30 is at the end of the cam 18, and the bar is raised to hold the end of pawl 35 away from the teeth of the lower wheel 24. If the switch arm 8 is now actuated to rotate wheel 16 in the direction indicated by the arrow, the end of cam 18 will move away from underneath the block 32 and the connection bar structure will drop. During the latter part of such downward movement of the bar, the pawl 35 engages with one of the teeth on the lower wheel 24 and this wheel is advanced to carry the switch arm 13 from one contact post to the next adjacent post. To prevent excessive advance of the wheel 24, a detent pin 37 is provided upon the bar structure to engage with one of the wheel teeth to stop the wheel after the pawl has sufficiently advanced it. As the upper wheel 16 continues to rotate, the cam 18 engages with block 32 to gradually raise the connecting bar, and the pawl 35 and detent pin 37 are again removed from wheel 24 and this wheel is then held by the brake lever 27. The downward movement of the connecting bar may be controlled by gravity, or, if desired, a spring may be provided in any suitable manner. Thus, when the connecting bar mechanism is in service, one complete revolution of switch arm 8 will carry its contact 9 successively into engagement with all of the contact posts 10, but wheel 24 will be advanced only one tooth and the switch arm 13 moved from one contact post to the next adjacent post.

In order that the two switch mechanisms may be operated entirely independently of each other, locking mechanism is provided for locking the connecting bar structure in inoperative position. As shown, a shaft 39 journaled in the switchboard adjacent to the lower end of the connecting bar, carries at its inner end a prop or detent arm 40, the shaft being controlled by means of a lever 41 at the front of the switchboard and secured to the front end of the shaft. The prop or detent arm 40 is adapted for coöperation with the abutment block 41' secured to the lower end of the connecting bar structure, and also to further guide the connecting bar structure, its lower end has the slot 42 for receiving the rear end of shaft 39. As shown, the detent arm or prop 40 is down, and the connecting bar structure is free to drop after release thereof by cam 18, and the switch mechanisms are inter-connected. If it is desired to make the switch mechanisms independently operative, the lever 41 is swung to move the prop 40 into vertical position, and the end of the prop coöperating with the abutment block 41' will raise the connecting bar structure to hold the block 32 out of the path of cam 18 and to hold the pawl 35 away from wheel 24. Either switch mechanism may now be independently controlled by its associated switch arm, and if inter-connection is again desired, lever 41 is swung to carry prop 40 out of the path of abutment 41'.

In order to yieldingly lock the detent arm or prop 40 in either of its positions, spring mechanism working on the dead line principle is utilized. As shown, a rectangular frame 43 is provided, extending about the shaft 39 and has one of its sides pivoted to the end of prop 40 and its other side connected with the spring 44 which is anchored to the switchboard. With this arrangement, when the arm 41 is moved to carry the prop 40 to either locking or release position with reference to the connecting bar structure, the spring mechanism will yieldingly lock the prop in such position and will also assist in swinging the prop to either position after the dead line is passed, this being a well understood operation.

The various contacts of the upper and lower switch mechanisms can, of course, be connected in any desired manner with current sources, testing instruments and the circuits to be tested. In Fig. 1, we have shown the mechanism applied for testing purposes in systems such as fire alarm systems. As shown, line circuits C terminate at the board at contacts c, c' and extend through fuses f, lightning arresters a, sneak coils s and spring jacks j, and to terminal mechanism m with which the various station mechanisms are connected. There may be any number of such line terminal equipments on the board, and, as shown, each contact 10 of the upper switch mechanism connects through a conductor b with a side of one of the circuits C, and a corresponding contact of the lower switch mechanism connects through conductor b' with the opposite side of the same circuit. As shown, the top contact of the upper switch mechanism connects through the various switch and protector mechanisms with the side c of the first circuit C, and the upper contact of the lower mechanism connects through conductor b' to the various switch and protector mechanisms with the side c' of the first circuit C. The upper switch mechanism has one contact, as for example, contact g connected with a ground conductor G, and the corresponding contact g' of the lower switch mechanism also connects with a ground conductor G'. The plate 19 of the upper switch mechanism, and thereby the contact 9 of the upper switch mechanism, connects through conductor d with contacts e, e' of two switch mechanisms E, E'. The switch mechanism E has also another contact h, and a switch arm i pivoted to the board is adapted to connect with either of the contacts e and h. Likewise, the switch mechanism E' has another contact h' and a switch arm i' adapted for engagement with either contacts h' or e'. On the front of the board, the switch arms i and i' are connected together for simultaneous operation by a cross bar k which cross bar, however, is insulated from the levers. The arm i connects with one terminal of the voltmeter V mounted on the board and the other terminal of the voltmeter connects through conductor d' with the plate 26 and thereby with the switch arm 13 and contact 14 of the lower switch mechanism. A battery B connects between the switch lever i' and the contact h.

The operation of our improved testing system can now be clearly understood. Suppose it is desired to test out the various c' sides of the lines. The switch arms E and E' are moved into engagement with the contacts e and h' respectively, and the contact arm 13 is moved into engagement with the ground contact g'. The contact arm 8 is then moved successively over its associated contacts connected with the c sides of the various circuits. If any of the c' sides are grounded, the following circuit will immediately be closed; from the grounded side c', through the battery S of the particular line, to the c side of that line and through the test conductor b to the test contact, then through contact arm 8, conductor d, switch arm E, through the voltmeter, conductor d', and contact arm 13 to ground, and the voltmeter will indicate that the c' side of the particular circuit tested is grounded. If it is desired to test out the c sides of the various circuits for a ground, the contact arm 8 is set on its ground contact g and the arm 13 moved successively into engagement with its contacts and a ground on any of the c sides will immediately be indicated on the voltmeter. When testing for grounds in this manner, the various line batteries S will supply the testing current. The battery B could also be utilized for supplying battery for such ground testing. For such test, the switch arms E and E' are moved into engagement with contacts h and e' respectively, and if it is desired to test the c' sides of the lines for ground, the switch arm 8 is set on its ground contact g and switch arm 13 moved successively over its contacts. As soon as any grounded c' side is reached, there will be a circuit from this grounded side through the associated test lead b', through switch arm 13, conductor d', the voltmeter, the battery B, conductor d, and through switch arm 8 to ground. If the c sides of the circuit are to be tested for ground, the switch arm 13 is set on its ground contact and the arm 8 moved successively into engagement with its contact. During such testing for grounds, the interconnecting mechanism between the switch mechanisms is locked in inoperative position. If, now, it is desired to test the various lines for crosses, the connecting bar 30 is unlocked and switch-arm 8 rotated. Switch arm 13 will then be advanced from one contact post to the next adjacent each time that the switch arm 8 makes a complete revolution, and during each revolution of the arm 8, each contact 10 and the test leads b extending therefrom will be connected in circuit with the contact of the lower switch mechanism engaged by switch arm 13 during such revolution of switch arm 8. The test circuit for a cross is as follows: from one terminal of the battery B through switch arm i, the voltmeter, conductor d', switch arm 13, one of the contacts 15, thence through the corresponding test lead b' to the corresponding line side c', and if this line is crossed with the particular line whose c side is at that time engaged by the switch arm 8, the circuit will be completed to the battery through the c side, its test lead b, switch arm 8, conductor d and switch arm i. Thus, each side of the lines is associated with every other side and if any line is crossed with any of the other lines, the voltmeter will so indicate. Also, when the connecting bar is in operation, the operator need only rotate arm 8 and watch the voltmeter and as soon as the voltmeter gives any indication, he can readily determine what particular lines are crossed, the contact posts bearing suitable numbers for identifying the lines with which they are connected. If the connecting bar is locked in inoperative position, the switch mechanisms can of course be independently operated to effect any particular test.

The contact o of the upper switch mechanism may connect through conductor p with terminal post q and the contact o' may connect through conductor p' with the post q' so that when the arms 8 and 13 are brought into engagement with the contacts o and o' respectively, the posts q and q' will be terminals of a test circuit including the voltmeter and battery, and leads extending from these posts can be utilized in any manner for testing in various ways on the board or elsewhere.

In order that the connecting bar mechanism, when made of metal, will not electrically connect together the switch arms 8 and 13 with whose shafts it comes into contact, the bar is preferably made of two sections secured together by insulation connection 45.

Changes and modifications can, of course, be made in the construction, arrangement and operation of the switching mechanisms and connecting mechanism without departing from the scope of the invention, and we do not, therefore, desire to be limited to what we have shown and described.

We claim the following:—

1. In a testing system, the combination of two switch mechanisms each comprising a plurality of contacts and a movable contact arm coöperating with said contacts, means for transmitting motion between said switch mechanisms, means for limiting said motion so that one complete cycle of movement of one mechanism will cause less than one complete cycle of movement of the other mechanism, and means for holding said transmitting means in inoperative position.

2. In a testing system, the combination of two switch mechanisms each comprising a rotatable contact arm, a brake wheel movable with said arm, a plurality of contacts adapted for successive engagement with said arm, a brake member yieldingly engaging said brake wheel, with a cam connected to move with one of said contact arms, a connecting rod adapted to be operated by said cam, a ratchet mechanism controlled by said rod to operate the other of said arms, and means for holding said connecting rod out of engagement with said cam.

3. In a testing system, the combination of two switch mechanisms each comprising a plurality of contacts for connecting with circuits to be tested and a movable contact arm for engaging with said contacts, a testing circuit adapted for connection with said contact arms and adapted to include a testing instrument, inter-connecting means for said contact arms adapted upon movement of one of said arms to automatically cause movement of the other contact arm, and means for locking said inter-connecting means in inoperative position to allow independent operation of said switch mechanisms.

4. In a testing system, the combination of two switch mechanisms, a rotatable contact arm for each switch mechanism and a plurality of contacts adapted for successive engagement with said switch arm, a connecting rod extending between the two switch mechanisms, drive mechanism for connecting said connecting rod with one of said switch arms, actuating mechanism connecting said rod with the other switch arm, means for holding said actuating mechanism in inoperative position, and means whereby one complete revolution of one switch arm will cause operation of the drive mechanism to advance the other switch arm a predetermined part of a complete revolution.

5. In a testing system, the combination of two switch mechanisms, a rotatable switch arm for each switch mechanism and a plurality of contacts therefor to be successively engaged thereby and adapted for connection with circuits to be tested, step-by-step connecting mechanism for said switch arms for causing a predetermined angular advance of one switch arm for each complete revolution of the other switch arm, and means for holding said step-by-step mechanism in inoperative position.

6. In a testing system, the combination of two switch mechanisms, a rotatable switch arm for each switch mechanism and a plurality of contacts therefor adapted for connection with circuits to be tested, a connecting rod extending between the two switch arms, a cam connected to move with one switch arm and coöperating with the connecting rod to set said connecting rod once for each complete revolution of the associated switch arm, a ratchet mechanism controlled by said connecting rod and associated with the other switch arm to cause a predetermined angular advance of said switch arm upon release of the connecting rod at the end of each complete revolution of the first switch arm by said cam.

7. In a testing system, the combination of two switch mechanisms each comprising a plurality of contacts and a movable contact arm for successively engaging with said contacts, a connecting rod extending between said switch mechanisms, ratchet mechanism at one of said switch mechanisms, and cam mechanism controlled upon movement of the arm at the other switch mechanism to effect reciprocation of said connecting rod and operation of the ratchet mechanism to move the contact arm of the first mentioned switch mechanism.

8. In a testing system, the combination of two switch mechanisms each comprising a rotatable contact arm and circuit contacts to be engaged thereby, a ratchet wheel connected with one of said contact arms, a connecting rod extending between said switch mechanisms, a pawl arm on said connecting rod for coöperating with said ratchet wheel and upon reciprocation of said rod, and means controlled upon rotation of said other contact arm for causing reciprocation of said rod.

9. In a testing system, the combination of two switch mechanisms each comprising a rotatable contact arm and circuit contacts to be engaged thereby, a ratchet wheel connected with one of said contact arms, a connecting rod extending between said switch mechanisms, a pawl arm on said connecting rod for coöperating with said ratchet wheel and upon reciprocation of said rod, and cam mechanism controlled upon rotation of said other contact arm to effect reciprocation of said connecting rod.

10. In a testing system, the combination of two switch mechanisms each comprising a rotatable contact arm and circuit contacts to be engaged thereby, a ratchet wheel connected with one of said contact arms, a connecting rod extending between said switch mechanisms, a pawl arm on said connecting rod for coöperating with said ratchet wheel and upon reciprocation of said rod, and cam mechanism controlled upon rotation of said other contact arm to effect reciprocation of said connecting rod, and means for holding said connecting rod away from said cam mechanism to prevent reciprocation thereof.

In witness whereof, we hereunto subscribe our names, this 5th day of April, A. D., 1912.

CLARENCE E. BEACH.
HERMAN W. DOUGHTY.

Witnesses:
　HENRY W. STRONG,
　CHARLES J. SCHMIDT.